Figure 1:
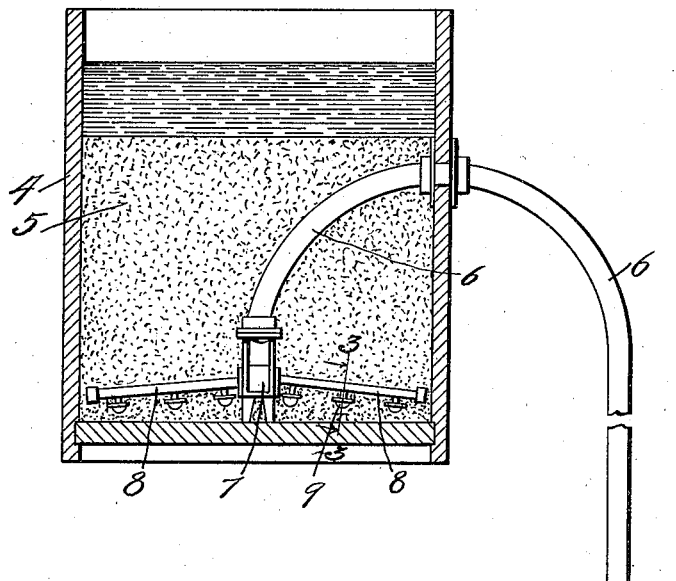

W. M. JEWELL.
METHOD OF PURIFYING WATER.
APPLICATION FILED DEC. 20, 1907.

903,138.

Patented Nov. 3, 1908.

Witnesses:

Inventor:
William M. Jewell,
his Attys

UNITED STATES PATENT OFFICE.

WILLIAM M. JEWELL, OF PARK RIDGE, ILLINOIS, ASSIGNOR TO THE JEWELL ENGINEERING COMPANY, OF CHICAGO, ILLINOIS, A CORPORATION OF ILLINOIS.

METHOD OF PURIFYING WATER.

No. 903,138.  Specification of Letters Patent.  Patented Nov. 3, 1908.

Application filed December 20, 1907. Serial No. 407,368.

*To all whom it may concern:*

Be it known that I, WILLIAM M. JEWELL, a citizen of the United States, residing at Park Ridge, in the county of Cook and State of Illinois, have invented certain new and useful Improvements in Methods of Purifying Water, of which the following is a specification, reference being had to the accompanying drawings.
My invention relates to the purification of water for potable and other purposes by the use of a granular filter, and has for its object to provide a new and improved method of water purification by the use of which the impurities may be efficiently removed without filtration being materially retarded by the accumulation of air in the filter-bed. A further object is to make practical the use of a much finer and more compact filter-bed than could heretofore be successfully employed with negative-head filters.

It is well understood by those familiar with the art that it is desirable to use fine sand for a filter-bed, as the friction between the water and the sand is thereby increased, effecting a great saving in the use of coagulants and securing more uniform results than can be obtained with a coarser filter-bed. The use of a bed of fine sand is especially advantageous in connection with so-called "negative-head" or "down-draft" filters, where the impure water is forced through the filter-bed by suction applied from below through the strainer system, by reason of the fact that the bed of fine sand is compacted more closely by the effect of such negative-head or down-draft, thus increasing the friction between the water and the sand. The result is that a greatly superior quality of water at a given rate of flow, or the same quality at a higher rate of flow, may be obtained than with the use of a coarser bed; besides the amount of coagulant required is proportionately less with the finer bed. The fine bed is also advantageous in washing the filter, since with fine sand it is practicable to use a thinner layer of sand for the bed, and the sand can be more easily suspended by the wash water as the area of the particles of sand is greater in proportion to their weight than in the case of larger grains; thus a violent agitation of the bed may be effected with less volume and pressure of water where the filter-bed is composed of fine sand, thereby effecting an important saving in the cost of operation, particularly in large plants, such as city water-works, where the volume of water to be purified is great. And this is especially true where filtered water is used for washing purposes, as is now the general practice.

In negative-head filters as heretofore constructed the passage of the impure water through the filter-bed under the influence of the negative-head has resulted in the separation from the water of the air contained in it and its accumulation in the filter-bed,—such accumulation taking place with greater rapidity as filtration continued, so that with a considerable amount of negative-head the filter would be clogged in a comparatively short time owing to the fact that the air accumulated in the bed would so impede the passage of the water through it as to make it necessary to wash the filter in order to restore the flow of water through it to the necessary volume. For this reason it has been found impractical to employ a negative-head of more than a few feet,—usually about four feet. Furthermore, the accumulation of air in the bed resulted in a variation in the density of different portions of the bed, since the air did not accumulate uniformly throughout the various strata of the bed,—the result being that, in filtering, the water would dart through the spaces affording less resistance, forming, in a sense, channels through which the water might pass without being properly filtered,—or at least filtered as efficiently as the water passing through other portions of the filter-bed.

I have discovered, however, that by employing the negative-head, or equivalent means, to force water through a granular filter-bed and at the same time preventing the accumulation of air within the filter-bed, water may be purified more efficiently than by the use of a filter in which the air does accumulate, and that the further advantages incident to the use of a bed of fine sand may be secured. Furthermore, I have found that by preventing the accumulation of air, as described, a much greater negative-head may be employed, with the greater rapidity of filtration incident thereto, without detriment to the quality of the effluent.

In the accompanying drawings I have illustrated a form of apparatus which may be employed for practicing my improved method, but it will be understood that my invention may be practiced by the use of any suitable form of apparatus.

Figure 2:
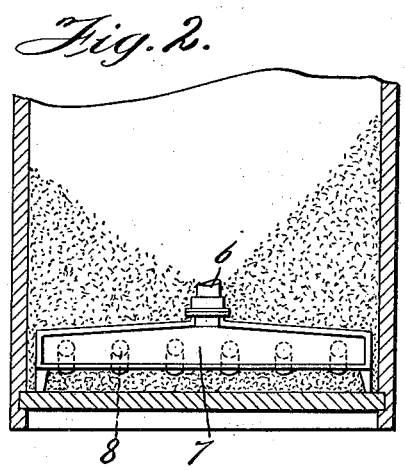
Figure 3:
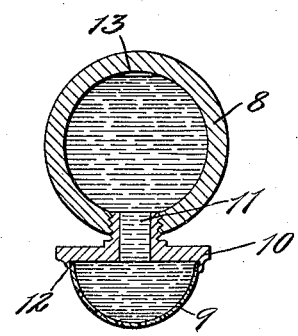

In the drawings,—Figure 1 is a sectional view, illustrating a filter; Fig. 2 is a similar view, showing the strainer system in section; and Fig. 3 is an enlarged detail, or sectional view of one of the manifold pipes, being a partial section on line 3—3 of Fig. 1.

Referring now to the drawings for a description of my improved method as practiced by the apparatus therein illustrated,— 4 indicates the filter-tank or tub, which may be of any suitable form and construction.

5 indicates a filter-bed, which is of fine sand and fills the greater portion of the tank.

6 indicates a pipe, through which filtered water is conducted from the filter, and which also serves as the inlet for water used in washing the filter.

7 indicates a header, which extends across the filter and is connected with the lower end of the pipe 6,—the upper portion of the header 7 extending down from said pipe, as shown in Fig. 2.

8 indicates a series of pipes, which, with the header 7, form a manifold through which filtered water is directed and delivered to the pipe 6. Said pipes are inclined downward from the header 7 and are provided on their under sides with strainers 9, preferably hemispherical in form, which are carried by plates 10, as shown in Fig. 3. In the construction shown each plate 10 is provided with a nipple 11, which screws into the under side of the pipe 8, and the strainer 9 is secured to the under side of the plate by an upset annular flange 12 which engages its margin. Any desired number of strainers may, of course, be provided. The outlet or discharge pipe 6 extends downward below the bottom of the filter as far as desired.

The operation is as follows. The impure water enters the filter at the top of the filter-bed and then descends through the bed to the strainers by gravity assisted by the influence of the negative-head or suction. As the water descends through the sand, or equivalent filtering material, the impurities are retained in the filter-bed and the air contained in the water is separated from it, the greater portion of the air passing down through the water and rising through the strainers into the pipes 8. As said pipes are inclined upward toward the manifold or header 7 the air rises to the top of the pipes 8, as indicated at 13 in Fig. 3, and passes up through said pipes and the header 7, which are also inclined upward at the top, toward the discharge pipe 6. Thus the air continues upward until it passes out of the pipe 6 with the filtered water. The result is that practically all the air separated from the water by its passage through the filter-bed is carried out with the effluent, leaving the filter-bed free to contract as fully as it may under the influence of suction or the negative-head. Moreover, the bed does not become air-choked and consequently may be used for a much greater length of time without washing.

My improved method is primarily intended for use in purifying water by filtration, but it may also be employed where the primary object is to remove air or other gases from water, in which case the passage of the water through a granular filter-bed, or equivalent apparatus, would be incidental to the primary object of removing from the water all or a portion of the gases contained therein. In the latter case the water passed through the filter might be perfectly clear before treatment. It will be understood, therefore, that the terms "filter", "filter-bed" and "air", as herein employed, are to be construed accordingly.

That which I claim as my invention, and desire to secure by Letters Patent, is,—

1. The method of purifying water, which consists in passing the water through a granular filter-bed under the influence of suction, causing air to separate therefrom, and allowing the separated air to escape as filtration progresses.

2. The method of purifying water, which consists in passing the water through a granular filter-bed, at the same time applying suction thereto, and causing the separated air to pass out of the filter-bed with the filtered water as filtration continues.

3. The method of purifying water, which consists in passing the water through a granular filter-bed and at the same time applying suction thereto, the air separated from the water during its passage through the filter-bed being continuously discharged with the filtered water.

4. The method of purifying water, which consists in passing the water downward through a granular filter-bed and at the same time applying suction thereto, the air separated from the water during its passage through the filter-bed being continuously discharged with the filtered water.

5. The method of purifying water, which consists in passing the water through a granular filter-bed under the influence of a negative-head, the air separated from the water during its passage through the filter-bed being continuously discharged with the filtered water.

WILLIAM M. JEWELL.

Witnesses:
JOHN L. JACKSON,
MINNIE A. HUNTER.